United States Patent
Han et al.

(10) Patent No.: US 11,817,582 B2
(45) Date of Patent: Nov. 14, 2023

(54) BINDER COMPOSITION FOR SECONDARY BATTERY, AND ELECTRODE SLURRY COMPOSITION, ELECTRODE AND SECONDARY BATTERY INCLUDING SAME

(71) Applicant: LG Chem, Ltd., Seoul (KR)

(72) Inventors: Hye Soo Han, Daejeon (KR); Seon Hee Han, Daejeon (KR); Min Ah Kang, Daejeon (KR); Cheol Hoon Choi, Daejeon (KR); Dong Jo Ryu, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/475,272

(22) PCT Filed: Nov. 29, 2018

(86) PCT No.: PCT/KR2018/014956
§ 371 (c)(1),
(2) Date: Jul. 1, 2019

(87) PCT Pub. No.: WO2019/135496
PCT Pub. Date: Jul. 11, 2019

(65) Prior Publication Data
US 2020/0194792 A1 Jun. 18, 2020

(30) Foreign Application Priority Data

Jan. 4, 2018 (KR) .................. 10-2018-0001126
Nov. 28, 2018 (KR) .................. 10-2018-0150034

(51) Int. Cl.
| | | |
|---|---|---|
| *H01M 4/62* | (2006.01) | |
| *C08F 212/08* | (2006.01) | |
| *C08F 236/10* | (2006.01) | |
| *C09D 125/10* | (2006.01) | |
| *C09D 109/08* | (2006.01) | |
| *H01M 10/052* | (2010.01) | |

(52) U.S. Cl.
CPC ........... *H01M 4/622* (2013.01); *C08F 212/08* (2013.01); *C08F 236/10* (2013.01); *C09D 109/08* (2013.01); *C09D 125/10* (2013.01); *H01M 10/052* (2013.01)

(58) Field of Classification Search
CPC . C09D 109/08; C09D 125/10; C08F 2/24–30; C08F 212/08; C08F 236/10
See application file for complete search history.

(56) References Cited

U.S. PATENT DOCUMENTS

| | | | | |
|---|---|---|---|---|
| 3,215,647 A | * | 11/1965 | Dunn .................. | C08L 2666/02 521/69 |
| 2012/0264878 A1 | | 10/2012 | Matsuyama et al. | |
| 2013/0216906 A1 | | 8/2013 | Kang et al. | |
| 2014/0342226 A1 | | 11/2014 | Sasaki | |
| 2016/0156038 A1 | | 6/2016 | Park et al. | |
| 2016/0233512 A1 | | 8/2016 | Park et al. | |
| 2018/0108912 A1 | * | 4/2018 | Kang ..................... | H01M 4/622 |
| 2018/0351177 A1 | | 12/2018 | Kang et al. | |
| 2019/0044148 A1 | | 2/2019 | Yamamoto | |
| 2019/0273261 A1 | | 9/2019 | Sonobe et al. | |

FOREIGN PATENT DOCUMENTS

| | | | | |
|---|---|---|---|---|
| CN | 104011919 A | 8/2014 | | |
| CN | 104981927 A | 10/2015 | | |
| CN | 105556718 A | 5/2016 | | |
| CN | 105794028 A | 7/2016 | | |
| CN | 106797032 A | 5/2017 | | |
| EP | 0591556 A1 | 4/1994 | | |
| JP | H09199135 A | 7/1997 | | |
| JP | 3082564 B2 | 8/2000 | | |
| JP | 2008088256 A | 4/2008 | | |
| JP | 2010146870 A | 7/2010 | | |
| JP | 2010205722 A | 9/2010 | | |
| JP | 2011134618 A | 7/2011 | | |
| JP | 2011165430 A | * | 8/2011 | |
| JP | WO2012002451 A1 | * | 8/2013 | ............ H01M 4/139 |
| JP | 5729389 B2 | 6/2015 | | |
| JP | 5949547 B2 | 7/2016 | | |
| KR | 20010099909 A | 5/2007 | | |
| KR | 20120010136 A | 2/2012 | | |
| KR | 20120039473 A | 4/2012 | | |
| KR | 101615940 B1 | 4/2016 | | |
| KR | 20160037949 A | 4/2016 | | |
| KR | 20160084053 A | 7/2016 | | |
| KR | 20170076296 A | 7/2017 | | |
| KR | 20170076592 A | 7/2017 | | |
| WO | 2010113940 A1 | 10/2010 | | |
| WO | 2011024789 A1 | 3/2011 | | |
| WO | 2012002451 A1 | 1/2012 | | |
| WO | WO-2012002451 A1 | * | 1/2012 | ........ H01M 10/0525 |
| WO | WO-2016204530 A1 | * | 12/2016 | ............ H01M 4/131 |
| WO | 2017110654 A1 | 6/2017 | | |
| WO | 2017141791 A | 8/2017 | | |

OTHER PUBLICATIONS

Machine Translation of WO2012/002451A1. Jan. 5, 2012. (Year: 2012).*
Machine Translation of JP2011-165430A. Aug. 25, 2011. (Year: 2011).*
Machine Translation of JPWO2012/002451 A1. Jan. 5, 2012 (Year: 2012).*

(Continued)

*Primary Examiner* — Stephen E Rieth
(74) *Attorney, Agent, or Firm* — Lerner David LLP

(57) ABSTRACT

The present invention relates to a binder composition for a secondary battery, an electrode slurry composition including the same, and an electrode and a secondary battery manufactured by using the same, the binder composition including: a latex particle (A) which is a polymer of a monomer mixture including (a1) a conjugated diene monomer, (a2) an ethylenically unsaturated carboxylic acid monomer, and (a3) an aromatic vinyl monomer; and an emulsifier (B), wherein the (a2) ethylenically unsaturated carboxylic acid monomer is included in an amount of 3 parts by weight or more based on 100 parts by weight of the monomer mixture and the emulsifier (B) is included in an amount of less than 3000 ppm based on 100 parts by weight of the latex particles.

4 Claims, No Drawings

(56) References Cited

OTHER PUBLICATIONS

Written Translation of Table 1 of WO2010/113940A1. Oct. 11, 2012. (Year: 2012).*
Extended European Search Report including Written Opinion for Application No. EP18887225.3, dated Dec. 17, 2019, pp. 1-7.
Search report from International Application No. PCT/KR2018/014956, dated Mar. 4, 2019.
Examination Report from the Office Action for Indian Application No. 201917030308 dated Feb. 28, 2022, 1 page.
Search Report dated Apr. 14, 2022 from the Office Action for Chinese Application No. 201880005185.1 dated Apr. 20, 2022, 2 pages.
Search Report of Chinese Application No. 201880005185 dated Oct. 11, 2021. 6 pgs.

* cited by examiner

BINDER COMPOSITION FOR SECONDARY BATTERY, AND ELECTRODE SLURRY COMPOSITION, ELECTRODE AND SECONDARY BATTERY INCLUDING SAME

CROSS-REFERENCE TO RELATED APPLICATIONS

The present application is a national phase entry under 35 U.S.C. § 371 of International Application No. PCT/KR2018/014956 filed Nov. 29, 2018, which claims priority from Korean Patent Application No. 10-2018-0001126, filed on Jan. 4, 2018, and No. 10-2018-0150034, filed on Nov. 28, 2018, in the Korean Intellectual Property Office, the disclosures of which are incorporated herein in their entirety by reference.

TECHNICAL FIELD

The present invention relates to a binder composition for a secondary battery, and an electrode slurry composition, an electrode and a secondary battery including the same, and more particularly to a binder composition for a secondary battery, which can prevent contamination of a rolling roll and of which adhesion reduction depending on a rolling length less occurs, and an electrode slurry composition, an electrode and a secondary battery including the same.

BACKGROUND ART

In recent years, as the technology development and demand for portable devices such as a portable computer, a cellular phone, and a camera have been increased, the demand for secondary batteries as energy sources has been remarkably increased, and many studies for, among these secondary batteries, a lithium secondary battery having high energy density, operating potential, long cycle life, and low self-discharge rate have been conducted and the lithium secondary battery is also commercialized and widely used.

An electrode of a lithium secondary battery is generally produced by mixing a positive electrode active material or a negative electrode active material with a binder and a conductive material, etc. and dispersing the mixture in a solvent to prepare an electrode slurry, and applying the electrode slurry to a surface of an electrode current collector, and then, drying and rolling the same.

The binder is used for ensuring adhesion or binding strength between an active material and an active material, and between an active material and an electrode current collector, and the binder material for a secondary battery which is currently used may be, for example, polyvinylidene fluoride (PVdF) or styrenebutadiene rubber (SBR)/carboxy methyl cellulose (CMC), etc.

By the way, when dispersibility of the binder is lowered, viscosity of the electrode slurry remarkably increases, thereby making coating difficult. This problem is more serious when a solvent of the electrode slurry is aqueous, and accordingly, a method for adding an emulsifier during producing the binder is used to improve stability of the binder used in the aqueous slurry. When a content of the emulsifier is increased, the stability of the binder is improved, thereby suppressing the increase of the slurry viscosity.

However, since the emulsifier has a lower molecular weight than other components, when a binder including an excess amount of an emulsifier is used, the emulsifier having a low molecular weight easily moves to the surface due to frictional heat generated in the electrode rolling process, and a problem of contaminating a rolling roll thereby occurs. The emulsifier attached to the rolling roll is attached on the rolling roll all the time due to force caused by a pressure provided from the rolling roll and is not easily removed. Meanwhile, since the emulsifier has adhesiveness, when the emulsifier is continuously attached to the rolling roll, other components of an electrode layer also adhere to the rolling roll to worsen the contamination. When rolling is performed using the contaminated rolling roll thereby, there is a problem such that the electrode is not uniformly rolled and the surface of the electrode is ununiformly formed.

Furthermore, a method for performing a rolling process for a long time or a multi-step rolling process, etc. has recently been proposed to improve the electrode density, but when the rolling process time is extended, there is a problem such that the adhesion of the conventional binders for a secondary battery is deteriorated, whereby the electrode materials may be detached and/or the active material layer may be peeled off.

DISCLOSURE OF THE INVENTION

Technical Problem

An aspect of the present invention to solve the problems provides a binder composition for a secondary battery, which can prevent contamination of a rolling roll and of which adhesion reduction depending on a rolling length less occurs, and a secondary battery including the same.

Technical Solution

According to an aspect of the present invention, there is provided a binder composition for secondary battery including a latex particle (A) which is a polymer of a monomer mixture including (a1) a conjugated diene monomer, (a2) an ethylenically unsaturated carboxylic acid monomer, and (a3) an aromatic vinyl monomer; and an emulsifier (B), wherein the ethylenically unsaturated carboxylic acid monomer is included in an amount of 3 parts by weight or more based on 100 parts by weight of the monomer mixture and the emulsifier is included in an amount of less than 3000 ppm based on 100 parts by weight of the latex particles.

According to another aspect of the present invention, there is provided an electrode slurry composition including an electrode active material, a binder composition for a secondary battery according to the present invention, and a solvent. At the time, the solvent may be an aqueous solvent such as water.

According to another aspect of the present invention, there are provided an electrode including an active material layer formed using the electrode slurry composition according to the present invention.

According to another aspect of the present invention, there are provided a secondary battery including the electrode.

Advantageous Effects

A binder composition for a secondary battery according to the present invention adjusts a content of an emulsifier and a content of ethylenically unsaturated carboxylic acid in a latex particle to specific ranges, thereby ensuring stability of a slurry while preventing contamination of a rolling roll caused by the excessive emulsifier.

Furthermore, when an electrode is produced using a binder composition for a secondary battery according to the present invention, adhesion reduction depending on a rolling length is remarkably improved.

BEST MODE FOR CARRYING OUT THE INVENTION

Hereinafter, the present invention will be described in more detail.

Binder Composition

First, a binder composition according to the present invention will be described.

A binder composition according to the present invention includes: a latex particle (A) which is a polymer of a monomer mixture including (a1) a conjugated diene monomer, (a2) an ethylenically unsaturated carboxylic acid monomer, and (a3) an aromatic vinyl monomer; and an emulsifier (B).

(A) Latex Particle

The latex particle is a polymer of a monomer mixture including (a1) a conjugated diene monomer, (a2) an ethylenically unsaturated carboxylic acid monomer, and (a3) an aromatic vinyl monomer.

As the (a1) conjugated diene monomer, at least one selected from the group consisting of, for example, 1,3-butadiene, isoprene, chloroprene, and piperylene may be used alone or in a mixture thereof, but the embodiment is not limited thereto.

The (a1) conjugated diene monomer may be included in an amount of 10-96 parts by weight, for example, 10-70 parts by weight or 10-50 parts by weight based on 100 parts by weight of the monomer mixture. When the content of the conjugated diene monomer satisfies the described range, excellent adhesion may be obtained.

Next, as the (a2) ethylenically unsaturated carboxylic acid monomer, at least one selected from the group consisting of, for example, acrylic acid, methacrylic acid, crotonic acid, isocrotonic acid, maleic anhydride, fumaric acid, and itaconic acid may be used alone or in a mixture thereof, but the embodiment is not limited thereto.

The (a2) ethylenically unsaturated carboxylic acid monomer may be included in an amount of 3 parts by weight or more, for example, 3-89 parts by weight, 3-30 parts by weight, or 3-10 parts by weight based on 100 parts by weight of the monomer mixture. When the content of the (a2) ethylenically unsaturated carboxylic acid monomer is less than 3 parts by weight, sufficient dispersibility is not ensured in an aqueous electrode slurry composition, and accordingly, prevention effects of adhesion reduction depending on a rolling length and contamination of a rolling roll are slight.

Next, as the (a3) aromatic vinyl monomer, at least one selected from the group consisting of, for example, styrene, α-methylstyrene, β-methylstyrene, p-methylstyrene, p-t-butylstyrene, and vinyltoluene may be used alone or in a mixture thereof, but the embodiment is not limited thereto.

The (a3) aromatic vinyl monomer may be included in an amount of 1-80 parts by weight, for example, 1-80 parts by weight, 1-70 parts by weight, 30-70 parts by weight, or 1-50 parts by weight based on 100 parts by weight of the monomer mixture. When the content of the (a3) aromatic vinyl monomer satisfies the described range, there is an advantage that strength and electrolyte affinity thereof are excellent.

On the other hand, the monomer mixture may further include a comonomer in addition to the (a1)-(a3) components.

As the comonomer, at least one selected from the group consisting of, for example, a vinyl cyanide-based monomer, a (meth)acrylate-based monomer, and a (meth)acrylamide-based monomer may be used.

Specific examples of the vinyl cyanide-based monomer may be acrylonitrile, methacrylonitrile, and a monomer having a cyanide functional group, etc., but the embodiment is not limited thereto.

Specific examples of the (meth)acrylate-based monomer may be methylacrylate, ethylacrylate, propylacrylate, isopropylacrylate, n-butylacrylate, isobutylacrylate, n-amylacrylate, isoamylacrylate, n-ethylhexylacrylate, 2-ethylhexylacrylate, 2-hydroxyethylacrylate, methylmethacrylate, ethylmethacrylate, propylmethacrylate, isopropylmethacrylate, n-butylmethacrylate, isobutylmethacrylate, n-amylmethacrylate, isoamylmethacrylate, n-hexylmethacrylate, n-ethylhexylmethacrylate, 2-ethylhexylmethacrylate, hydroxyethylmethacrylate, and hydroxypropylmethacrylate, etc., but the embodiment is not limited thereto.

Specific examples of the (meth)acrylamide-based monomer may be acrylamide, n-methylolacrylamide, n-butoxymethylacrylamide, n-methylolmethacrylamide, and n-butoxymethylmethacrylamide, etc., but the embodiment is not limited thereto.

According to one embodiment, the monomer mixture may include 10-96 parts by weight of the (a1) conjugated diene monomer or conjugated diene polymer, 3-30 parts by weight of the (a2) ethylenically unsaturated carboxylic acid monomer, and 1-80 parts by weight of the (a3) aromatic vinyl monomer based on 100 parts by weight of the monomer mixture.

According to another embodiment, the monomer mixture may include 10-70 parts by weight of the (a1) conjugated diene monomer or conjugated diene polymer, 3-10 parts by weight of the (a2) ethylenically unsaturated carboxylic acid monomer, and 30-70 parts by weight of the (a3) aromatic vinyl monomer based on 100 parts by weight of the monomer mixture.

The latex particle (A) may be prepared by polymerizing a monomer mixture including the described components using the conventional polymerization methods known in the art. For example, the latex particle (A) may be prepared by an emulsion polymerization method in which an emulsifier is added to the monomer mixture.

A polymerization temperature and a polymerization time may be appropriately determined depending on a polymerization method and a kind of a polymerization initiator, etc., for example, the polymerization temperature may be from 50-200° C. and the polymerization time may be 1-20 hours.

Furthermore, a polymerization initiator, an activator, a cross-linking agent, a molecular weight regulator, or the like may be further added during the polymerization when needed.

As the polymerization initiator, an inorganic or organic peroxide may be used, for example, a water-soluble initiator including potassium persulfate, sodium persulfate, or ammonium persulfate, etc. and an oil-soluble initiator including cumene hydroperoxide or benzoyl peroxide, etc. may be used.

In addition, an activator may further be included with the polymerization initiator to promote an initiation reaction of the peroxide and the activator may be at least selected from the group consisting of, for example, sodium formaldehyde sulfoxylate, sodium ethylenediamine tetraacetate, ferrous sulfate, and dextrose.

As the cross-linking agent, for example, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylolmethane triacrylate, or aryl methacrylate (AMA), etc. may be used, and as a grafting agent, for example, aryl methacrylate (AMA), triaryl isocyanurate (TRIC), triaryl amine (TAA), or diaryl amine (DAA), etc. may be used.

As the molecular weight regulator, for example, mercaptans; terpenes such as terpinolene, dipentene, and t-terpinene; or halogenated hydrocarbons such as chloroform and carbon tetrachloride, etc. may be used.

Meanwhile, when the latex particles (A) are filtered through a 400-mesh sieve, an amount of the remainder remaining on the sieve may be 0.01 parts by weight or less, specifically 0.001-0.01 parts by weight based on 100 parts by weight of a solid content of the latex particles. When the filtered remainder of the latex particles satisfies the described range, uniformity and adhesion with a current collector may be further improved when the current collector is coated.

The latex particles, in which the content of the filtered remainder of the latex particles satisfies the described range, may be prepared, for example, by adopting a method for continuously adding monomers as raw materials during polymerizing not adding all the monomers in the initial reaction or by performing filtration treatment using diatomite earth as a filter aid after polymerization of the latex particles, but the embodiment is not limited thereto.

(B) Emulsifier

The emulsifier is added for an emulsion polymerization of the latex particle (A), and any materials having both a hydrophilic group and a hydrophobic group at the same time may be used and the kind thereof is not particularly limited.

As the emulsifier, for example, fatty acid salts such as oleic acid, stearic acid, lauric acid, and a sodium or potassium salt of mixed fatty acid; or a general anionic emulsifier such as sulfate, sulfonate, phosphate, and sulfosuccinate may be used.

According to the studies of the present inventors, it has been found that when a content of the emulsifier in the binder composition satisfies a specific range, there are effects such that not only contamination of a rolling roll may be prevented but also adhesion reduction depending on a rolling length is prevented.

Specifically, the binder composition according to the present invention includes the emulsifier in an amount of less than 3000 ppm, preferably 500-2500 ppm based on 100 parts by weight of the latex particles. When the content of the emulsifier is 3000 ppm or more, there are problems such that contamination of the rolling roll occurs and adhesion is remarkably deteriorated when a rolling length is increased.

On the other hand, the binder composition of the present invention may further include an additive component in addition to the described components to improve properties of the binder. The additive may be, for example, an antioxidant or a preservative, etc. Particularly, an antioxidant may be preferably used to prevent deterioration of the latex particle due to softening or gelation, etc. during operation of a battery.

The additive may be included in an appropriate amount within a range in which the physical properties of the binder composition are not deteriorated, and for example, the additive may be included in an amount of 0.5 parts by weight or less, preferably 0.01-0.2 parts by weight based on 100 parts by weight of the binder composition.

Electrode Slurry Composition

Next, an electrode slurry composition of the present invention will be described.

An electrode slurry composition according to the present invention includes: an electrode active material; a binder composition; and a solvent, and may further include a conductive material when needed.

The electrode active material may be a positive electrode active material or a negative electrode active material.

As the positive electrode active material and the negative electrode active material, various positive electrode active materials and negative electrode active materials used in the art may also be used, and the kind thereof is not particularly limited.

As the positive electrode active material, for example, a layered compound (such as lithium cobalt oxide ($LiCoO_2$) and lithium nickel oxide ($LiNiO_2$)) or a compound in which one or more transition metals are substituted; lithium manganese oxide (such as Formulae $Li_{1+y}Mn_{2-y}O_4$ (where y is 0-0.33), $LiMnO_3$, $LiMn_2O_3$, and $LiMnO_2$); lithium copper oxide ($Li_2CuO_2$); vanadium oxides (such as $LiV_3O_8$, $LiFe_3O_4$, $V_2O_5$, and $Cu_2V_2O_7$); Ni-site type lithium nickel oxide represented by Formula $LiNi_{1-y}M_yO_2$ (where M=Co, Mn, Al, Cu, Fe, Mg, B, or Ga and y=0.01-0.3); lithium manganese complex oxide represented by Formula $LiMn_{2-y}M_yO_2$ (where M=Co, Ni, Fe, Cr, Zn, or Ta and y=0.01-0.1) or Formula $Li_2Mn_3MO_8$ (where M=Fe, Co, Ni, Cu, or Zn); $LiMn_2O_4$ in which some of Li in the formula are substituted with alkaline earth metal ions; a disulfide compound; or $Fe_2(MoO_4)_3$, etc. may be used, but the embodiment is not limited thereto.

As the negative electrode active material, for example, carbon (such as non-graphitized carbon and graphite carbon); metal complex oxide (such as $Li_xFe_2O_3$ ($0 \le X \le 1$), $Li_xWO_2$ ($0 \le X \le 1$), and $Sn_xMe_{1-x}Me'_yO_z$ (where Me=Mn, Fe, Pb, or Ge, Me'=Al, B, P, Si, Group 1, 2, and 3 elements in the periodic table, or halogen, $0<x \le 1$, $1 \le y \le 3$ and $1 \le z \le 8$)); a lithium metal; a lithium alloy; a silicon-based alloy; a tin-based alloy; metal oxide (such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$); or a Li—Co—Ni-based material, etc. may be used, but the embodiment is not limited thereto.

The solvent may be optionally used depending on a type of the binder, and for example, an organic solvent such as isopropyl alcohol, N-methylpyrrolidone (NMP), and acetone; an aqueous solvent such as water; and a mixture thereof may be used. The binder composition of the present invention may be particularly useful for an electrode slurry using an aqueous solvent such as water.

The conductive material is not particularly limited as long as having electrical conductivity without causing any chemical changes in the battery, and for example, graphite (such as natural graphite and synthetic graphite); a carbon-black (such as carbon black, acetylene black, Ketjen black, channel black, furnace black, lamp black, thermal black, and carbon fiber); a conductive fiber (such as carbon fiber and metal fiber); a metal powder (such as a carbon fluoride powder, an aluminum powder, and a nickel powder); conductive whisker (such as zinc oxide and potassium titanate);

conductive metal oxide (such as titanium oxide); or a conductive material (such as a polyphenylene derivative), etc. may be used.

In addition, a viscosity modifier, a filler, and the like may be optionally added to the electrode slurry when needed. The viscosity modifier is a component serving to adjust viscosity of the electrode mixture so that the mixing process and the applying process on the current collector of the electrode mixture may be easy, and examples of the viscosity modifier may include carboxymethylcellulose, polyacrylic acid, or the like, but the embodiment is not limited thereto. The filler is not particularly limited as long as a fibrous material without causing any chemical changes in the battery, and for example, an olefin-based polymer such as polyethylene and polypropylene; or a fibrous material such as a glass fiber and a carbon fiber, etc. may be used.

Electrode and Secondary Battery

Next, an electrode and a secondary battery according to the present invention will be described.

The electrode according to the present invention may be a positive electrode or a negative electrode, and may be produced by the same manner as a general electrode producing method except that the described electrode slurry composition of the present invention is used.

Specifically, the electrode according to the present invention may be produced through a method in which applying the electrode slurry composition onto an electrode current collector and drying the same, and then rolling the same; or applying the electrode slurry composition onto a separate substrate and drying the same, and then being bonded to the electrode current collector through a pressing method or a laminating method, etc. and rolling the same.

A kind of the electrode current collector is not particularly limited as long as the electrode current collector has high electrical conductivity without causing any chemical changes in the battery, and for example, a material in which a surface of copper, stainless steel, aluminum, nickel, titanium, sintered carbon, copper, or stainless steel is surface-treated with carbon, nickel, titanium, or silver, etc.; or an aluminum-cadmium alloy, etc. may be used. Preferably, the electrode current collector may be a metal foil, and may be an aluminum (Al) foil or a copper (Cu) foil. Specifically, the positive electrode current collector may be a metal current collector including aluminum and the negative electrode current collector may be a metal current collector including copper.

On the other hand, a method for applying the electrode slurry is not particularly limited and the applying method may be performed by using any optional coater head among various applying methods used in the art, for example, a reverse roll method, a comma bar method, a gravure method, or an air knife method, etc. Specifically, the electrode slurry may be applied onto the electrode current collector in predetermined pattern and thickness by passing through the coater head.

On the other hand, the drying is a process for removing the solvent and moisture in the electrode slurry, and may be performed by using, for example, a left alone-drying process, an air dryer, a hot-air drier, an infrared heater, or a far infrared ray heater, etc. A temperature of the drying may be, for example, about 50-200° C.

Next, the rolling is performed to improve capacity density of the electrode and to improve adhesion between the current collector and the active material, and may be performed by a method of passing the electrode through two rolling rolls heated to a high temperature to compress in a desired thickness. A rolling thickness, a rolling temperature, and a rolling time, etc. in the rolling process may be appropriately adjusted depending on physical properties of a finally desired electrode. Meanwhile, although not essential, a process for pre-heating an electrode may be further performed to improve rolling efficiency before the rolling process.

The electrode produced using the described binder composition of the present invention has a lower adhesion reduction rate before and after the rolling than that of the conventional electrode. Specifically, the electrode has an adhesion reduction rate of 20% or less, preferably 15% or less, more preferably 12% or less after rolled to a length of 2000 m with respect to the adhesion before rolled.

Furthermore, contamination of the rolling roll is reduced by using the binder composition of the present invention as compared with using the conventional binder composition. Specifically, when an electrode is produced using the binder composition of the present invention, a reduction rate of a L value of the rolling roll after the electrode is rolled to a length of 2000 m with respect to a L value of the rolling roll measured before the electrode is rolled is 25% or less, preferably 23% or less, more preferably 20% or less.

Secondary Battery

A secondary battery according to the present invention includes the described electrode according to the present invention, and specifically, the secondary battery may include a positive electrode, a negative electrode, a separator interposed between the positive electrode and the negative electrode, and an electrolyte, wherein the positive electrode and/or the negative electrode may be the described electrode of the present invention, that is, may be an electrode formed of the electrode slurry composition including the binder composition according to the present invention.

Preferably, the secondary battery may be a lithium secondary battery, and may be, for example, a lithium ion secondary battery, a lithium polymer secondary battery, or a lithium ion polymer secondary battery.

The separator serves to separate the negative electrode and the positive electrodes from each other and provide a transfer channel of lithium ions, and any separator may be used without particular limitation as long as typically used as a separator in a lithium secondary battery, and particularly, a separator having excellent electrolyte-retention ability as well as low-resistance to transfer of the electrolyte ions may be preferably used for the separator. Specifically, a porous polymer film, for example, a porous polymer film formed of a polyolefin-based polymer (such as an ethylene homopolymer, a propylene homopolymer, an ethylene/butene copolymer, an ethylene/hexene copolymer, and an ethylene/methacrylate copolymer) or a laminated structure having two or more layers thereof may be used. Alternatively, a typical porous nonwoven fabric, for example, a nonwoven fabric formed of glass fibers or polyethylene terephthalate fibers which has high melting point may be used. Alternatively, a coated separator including a ceramic component or a polymer material may be used to ensure heat-resistance or mechanical strength and either a single-layer structure or a multi-layer structure may be selectively used.

Furthermore, as the electrolyte, for example, an organic-based liquid electrolyte, an inorganic-based liquid electrolyte, a solid polymer electrolyte, a gel-type polymer electrolyte, a solid inorganic electrolyte, or a molten-type inorganic electrolyte, etc., which is available during manufacturing a secondary battery, may be used, and the kind thereof is not particularly limited.

For example, the electrolyte may include a non-aqueous organic solvent and a metal salt, and as the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In addition, a lithium salt may be used as the metal salt, and specifically, a lithium salt including at least one anion selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used, but the embodiment is not limited thereto.

In addition to the electrolyte components, the electrolyte may further include additives to improve life-time characteristics of a battery, suppress capacity reduction of a battery, and improve discharge capacity of a battery. One more additives among, for example, a haloalkylenecarbonate-based compound (such as difluoroethylenecarbonate), pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, etc. may be further included.

The described secondary battery of the present invention may be usefully applied to a battery module and/or a battery pack as a unit cell, and the battery module and/or the battery pack may be used as a power source of a middle-sized or large-sized device selected from a group consisting of electric vehicles, hybrid electric vehicles, plug-in hybrid electric vehicles, and a power storage system.

MODE FOR CARRYING OUT THE INVENTION

Hereinafter, the present invention will be described in more detail according to examples. However, the invention may be embodied in many different forms and should not be construed as being limited to the embodiments set forth herein.

EXAMPLE 1

61 parts by weight of 1,3-butadiene, 35 parts by weight of styrene, 4 parts by weight of acrylic acid, 1 part by weight of a polymerization initiator (sodium persulfate), and 2000 ppm of an emulsifier (sodium polyoxyethylene lauryl ether sulfate) were added to distilled water and the mixture was polymerized at 80° C. for 5 hours to prepare a binder composition including latex particles.

EXAMPLE 2

46 parts by weight of 1,3-butadiene, 50 parts by weight of styrene, 3 parts by weight of acrylic acid, 1 part by weight of methacrylic acid, 1 part by weight of a polymerization initiator (potassium persulfate), and 1500 ppm of an emulsifier (sodium polyoxyethylene lauryl ether sulfate) were added to distilled water and the mixture was polymerized at 70° C. for 6 hours to prepare a binder composition including latex particles.

EXAMPLE 3

25 parts by weight of 1,3-butadiene, 70 parts by weight of styrene, 3 parts by weight of itaconic acid, 2 parts by weight of methacrylic acid, 1 part by weight of a polymerization initiator (ammonium persulfate), and 2000 ppm of an emulsifier (sodium dodecyl sulfate) were added to distilled water and the mixture was polymerized at 60° C. for 7 hours to prepare a binder composition including latex particles.

Comparative Example 1

64 parts by weight of 1,3-butadiene, 35 parts by weight of styrene, 1 part by weight of acrylic acid, 1 part by weight of a polymerization initiator (sodium persulfate), and 4000 ppm of an emulsifier (sodium dodecyl sulfate) were added to distilled water and the mixture was polymerized at 80° C. for 5 hours to prepare a binder composition including latex particles.

Comparative Example 2

48 parts by weight of 1,3-butadiene, 50 parts by weight of styrene, 1 part by weight of acrylic acid, 1 part by weight of methacrylic acid, 1 part by weight of a polymerization initiator (potassium persulfate), and 3000 ppm of an emulsifier (sodium polyoxyethylene lauryl ether sulfate) were added to distilled water and the mixture was polymerized at 70° C. for 6 hours to prepare a binder composition including latex particles.

Comparative Example 3

28 parts by weight of 1,3-butadiene, 70 parts by weight of styrene, 1 part by weight of itaconic acid, 1 part by weight of methacrylic acid, 1 part by weight of a polymerization initiator (ammonium persulfate), and 4000 ppm of an emulsifier (sodium polyoxyethylene lauryl ether sulfate) were added to distilled water and the mixture was polymerized at 60° C. for 7 hours to prepare a binder composition including latex particles.

Comparative Example 4

61 parts by weight of 1,3-butadiene, 35 parts by weight of styrene, 4 parts by weight of acrylic acid, 1 part by weight of a polymerization initiator (sodium persulfate), and 5000 ppm of an emulsifier (sodium polyoxyethylene lauryl ether sulfate) were added to distilled water and the mixture was polymerized at 60° C. for 7 hours to prepare a binder composition including latex particles.

Comparative Example 5

47 parts by weight of 1,3-butadiene, 50 parts by weight of styrene, 1 part by weight of itaconic acid, 2 parts by weight of methacrylic acid, 1 part by weight of a polymerization initiator (potassium persulfate), and 4000 ppm of an emulsifier (sodium dodecyl sulfate) were added to distilled water and the mixture was polymerized at 80° C. for 5 hours to prepare a binder composition including latex particles.

Comparative Example 6

26 parts by weight of 1,3-butadiene, 70 parts by weight of styrene, 2 parts by weight of acrylic acid, 2 parts by weight of itaconic acid, 1 part by weight of a polymerization initiator (ammonium persulfate), and 3000 ppm of an emulsifier (sodium polyoxyethylene lauryl ether sulfate) were added to distilled water and the mixture was polymerized at 70° C. for 6 hours to prepare a binder composition including latex particles.

Experimental Example

The binder composition, the negative electrode active material (natural graphite), the conductive material (carbon black), and the viscosity modifier prepared by Examples 1 to 3 and Comparative Examples 1 to 6 were added to distilled water as a solvent at a weight ratio of 3:95:1:1 to prepare a negative electrode slurry.

A L value of a color-difference meter and adhesion depending on a rolling length were measured according to a measuring method below while the prepared negative electrode slurry was applied onto a copper foil thin film, dried and rolled the same to prepare a negative electrode.

(1) L Value of Color-Difference Meter

After a rolling roll was stopped at the rolling length to be measured in a rolling process, a color-difference meter was brought into tight contact with a surface of the rolling roll at a right angle, and a L value representing a whiteness degree by emitting light was measured. When the measured site is all white, the L value is 0 or 100, and as colors other than the white are present, the L value decreases gradually from 100 to 0. That is, the smaller the L value of the color-difference meter, the more severe the rolling roll contamination. The measurement was performed by dividing the roll surface into three equal portions in a left and right direction and measuring each portion once, and an average value of the three values was measured as the measured value.

(2) Adhesion

The negative electrode prepared in Examples and Comparative Examples was cut into a predetermined size and fixed to a slide glass, and then, 180° peeling strength was measured while peeling off a current collector. Five peeling strengths were measured for one negative electrode, and then, an average value thereof was measured as the adhesion.

The measured results are shown in [Table 1] below.

TABLE 1

| Division | Rolling length | Value of color-difference meter | Reduction rate of color-difference meter Unit | Adhesion | Reduction rate of adhesion |
|---|---|---|---|---|---|
| | m | L value | % | gf/cm | % |
| Example 1 | 0 | 80 | 20% | 89 | 10% |
| | 500 | 75 | | 88 | |
| | 1000 | 72 | | 87 | |
| | 2000 | 60 | | 80 | |
| Example 2 | 0 | 80 | 18% | 76 | 12% |
| | 500 | 77 | | 76 | |
| | 1000 | 70 | | 73 | |
| | 2000 | 62 | | 67 | |
| Example 3 | 0 | 80 | 17% | 96 | 7% |
| | 500 | 76 | | 94 | |
| | 1000 | 70 | | 92 | |
| | 2000 | 63 | | 89 | |
| Comparative Example 1 | 0 | 80 | 29% | 82 | 24% |
| | 500 | 72 | | 76 | |
| | 1000 | 68 | | 68 | |
| | 2000 | 51 | | 62 | |
| Comparative Example 2 | 0 | 80 | 27% | 61 | 28% |
| | 500 | 70 | | 57 | |
| | 1000 | 62 | | 50 | |
| | 2000 | 53 | | 44 | |
| Comparative Example 3 | 0 | 80 | 31% | 75 | 31% |
| | 500 | 69 | | 69 | |
| | 1000 | 60 | | 58 | |
| | 2000 | 49 | | 50 | |
| Comparative Example 4 | 0 | 80 | 45% | 85 | 45% |
| | 500 | 63 | | 75 | |
| | 1000 | 49 | | 68 | |
| | 2000 | 35 | | 59 | |
| Comparative Example 5 | 0 | 80 | 37% | 65 | 37% |
| | 500 | 69 | | 57 | |
| | 1000 | 57 | | 49 | |
| | 2000 | 43 | | 45 | |
| Comparative Example 6 | 0 | 80 | 28% | 87 | 28% |
| | 500 | 71 | | 79 | |
| | 1000 | 66 | | 75 | |
| | 2000 | 52 | | 69 | |

It is confirmed from Table 1 above that the L value reduction of the color-difference meter and adhesion reduction depending on the rolling length in Examples 1 to 3 using the binder composition of the present invention are remarkably smaller than those in Comparative Examples 1 to 6.

The invention claimed is:

1. A negative electrode slurry composition for a secondary battery comprising:
   a negative electrode active material,
   a binder composition,
   conductive material, and
   an aqueous solvent;
   wherein the binder composition comprises:
   latex particles (A) which are polymers of a monomer mixture consisting of:
   (a1) a conjugated diene monomer in an amount of 25-61 parts by weight based on 100 parts by weight of the monomer mixture, wherein the conjugated diene monomer is 1,3-butadiene,
   (a2) an ethylenically unsaturated carboxylic acid monomer in an amount of 3-5 parts by weight based on 100 parts by weight of the monomer mixture, wherein the ethylenically unsaturated carboxylic acid monomer is at least one selected from the group consisting of acrylic acid, methacrylic acid, and itaconic acid, and
   (a3) an aromatic vinyl monomer in an amount of 35-70 parts by weight based on 100 parts by weight of the monomer mixture; wherein the aromatic vinyl monomer is styrene, and an emulsifier (B);
   wherein the emulsifier (B) is included in an amount of 1500 ppm to 2000 ppm based on 100 parts by weight of the latex particles, wherein the emulsifier is sodium polyoxyethylene lauryl ether sulfate or sodium dodecylsulfate,
   wherein when the latex particles (A) are filtered through a 400-mesh sieve, an amount of the remainder remaining on the sieve is 0.001-0.01 parts by weight based on 100 parts by weight of a solid content of the latex particles.

2. A negative electrode comprising a negative electrode active material layer prepared by the negative electrode slurry composition of claim 1.

3. The negative electrode of claim 2,
   wherein the negative electrode has an adhesion reduction rate of 20% or less after rolled to a length of 2000 m with respect to adhesion before rolled.

4. A secondary battery comprising the negative electrode of claim 2.

* * * * *